United States Patent
Shirado et al.

(10) Patent No.: US 9,930,195 B2
(45) Date of Patent: Mar. 27, 2018

(54) IMAGE READING DEVICE, IMAGE PROCESSING APPARATUS, AND IMAGE READING METHOD

(71) Applicants: Hiroki Shirado, Kanagawa (JP); Masaki Nagase, Kanagawa (JP); Naoki Asaba, Kanagawa (JP); Hideki Hashimoto, Kanagawa (JP)

(72) Inventors: Hiroki Shirado, Kanagawa (JP); Masaki Nagase, Kanagawa (JP); Naoki Asaba, Kanagawa (JP); Hideki Hashimoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/988,802

(22) Filed: Jan. 6, 2016

(65) Prior Publication Data
US 2016/0219163 A1    Jul. 28, 2016

(30) Foreign Application Priority Data
Jan. 23, 2015   (JP) .................... 2015-011576

(51) Int. Cl.
*H04N 1/00*   (2006.01)
(52) U.S. Cl.
CPC ....... *H04N 1/00257* (2013.01); *H04N 1/0083* (2013.01); *H04N 1/00806* (2013.01);
(Continued)
(58) Field of Classification Search
CPC ................................................ H04N 1/00257
See application file for complete search history.

(56) References Cited

U.S. PATENT DOCUMENTS 5,886,342 A * 3/1999 Matsui .................. G01B 11/25
   250/208.1
5,940,544 A * 8/1999 Nako ................. H04N 1/00681
   358/496
(Continued)

FOREIGN PATENT DOCUMENTS

| JP | H08-227452 | 9/1996 |
| JP | H10-327301 | 12/1998 |
| JP | 2016-32219 A | 3/2016 |

OTHER PUBLICATIONS

U.S. Appl. No. 14/745,967, filed Jun. 22, 2015.
U.S. Appl. No. 14/750,143, filed Jun. 25, 2015.
U.S. Appl. No. 14/922,546, filed Oct. 26, 2015.

*Primary Examiner* — Ibrahim Siddo
(74) *Attorney, Agent, or Firm* — Oblon, McClelland, Maier & Neustadt, L.L.P.

(57) ABSTRACT

An image reading device includes a shooting unit, a light source unit, a shooting controller, and a combining unit. The light source unit sequentially irradiates the bound document with light from first and second irradiation positions opposing each other with respect to a first straight line orthogonal to a direction of a binding portion of the document. The shooting controller controls the shooting unit to shoot a first region positioned at the second irradiation position side on the document when the light source unit irradiates the document with light from the first irradiation position, and controls the shooting unit to shoot a second region containing a region other than the first region on the document when the light source unit irradiates the document with light from the second irradiation position. The combining unit combines a shot image of the first region and a shot image of the second region.

8 Claims, 10 Drawing Sheets

(52) U.S. Cl.
CPC . *H04N 1/00835* (2013.01); *H04N 2201/0068* (2013.01); *H04N 2201/0084* (2013.01); *H04N 2201/0426* (2013.01); *H04N 2201/0434* (2013.01)

(56) References Cited

U.S. PATENT DOCUMENTS

| | | | |
|---|---|---|---|
| 2004/0013958 A1* | 1/2004 | Ayaki | G03G 9/0821 |
| | | | 430/45.5 |
| 2004/0169870 A1* | 9/2004 | Ahmed | G06T 3/403 |
| | | | 358/1.8 |
| 2008/0231918 A1 | 9/2008 | Nagase | |
| 2008/0297616 A1 | 12/2008 | Nagase et al. | |
| 2009/0059324 A1 | 3/2009 | Nagase et al. | |
| 2009/0213261 A1 | 8/2009 | Nagase et al. | |
| 2010/0231979 A1 | 9/2010 | Nagase et al. | |
| 2011/0051201 A1 | 3/2011 | Hashimoto et al. | |
| 2012/0057211 A1 | 3/2012 | Shirado | |
| 2012/0062962 A1 | 3/2012 | Nagase | |
| 2012/0098187 A1* | 4/2012 | Harashima | B65H 5/062 |
| | | | 271/121 |
| 2014/0043629 A1 | 2/2014 | Shirado | |
| 2014/0204432 A1 | 7/2014 | Hashimoto et al. | |
| 2014/0368893 A1 | 12/2014 | Nakazawa et al. | |
| 2015/0098117 A1 | 4/2015 | Marumoto et al. | |
| 2015/0222790 A1 | 8/2015 | Asaba et al. | |
| 2015/0304517 A1 | 10/2015 | Nakazawa et al. | |
| 2015/0341521 A1 | 11/2015 | Asaba et al. | |

* cited by examiner

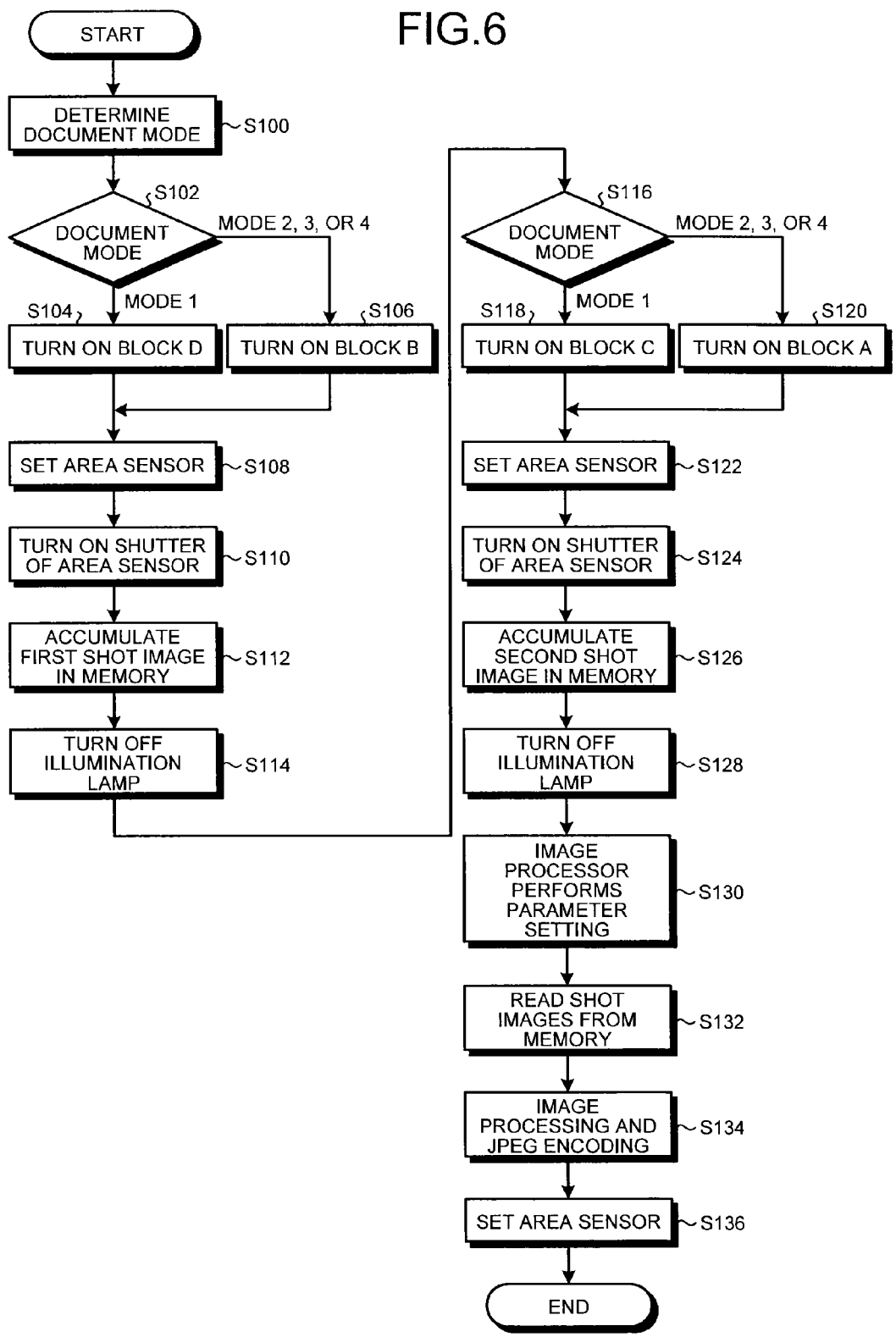

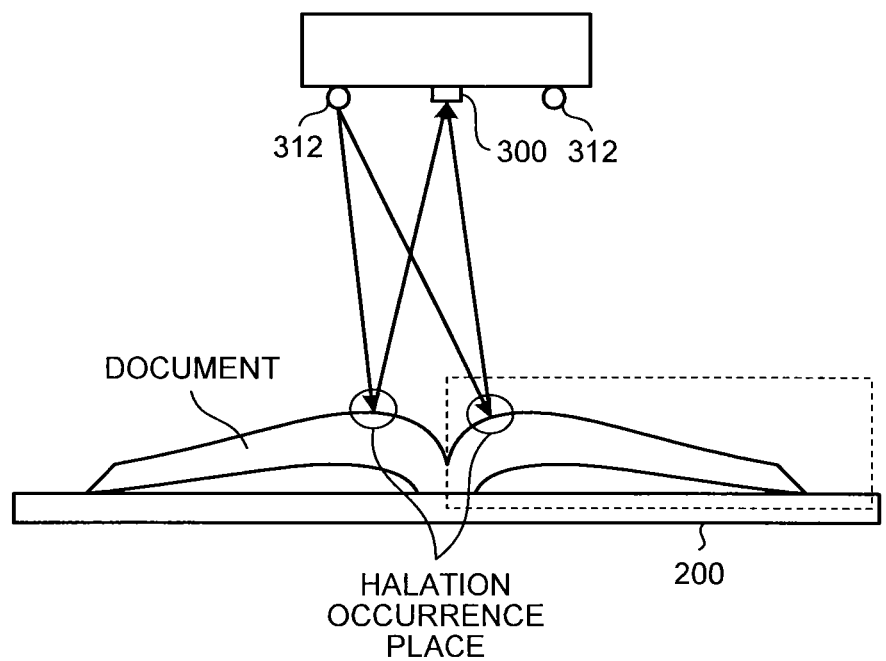

IMAGE READING DEVICE, IMAGE PROCESSING APPARATUS, AND IMAGE READING METHOD

CROSS-REFERENCE TO RELATED APPLICATIONS

The present application claims priority to and incorporates by reference the entire contents of Japanese Patent Application No. 2015-011576 filed in Japan on Jan. 23, 2015.

BACKGROUND OF THE INVENTION

1. Field of the Invention

The present invention relates to an image reading device, an image processing apparatus, and an image reading method.

2. Description of the Related Art

Image reading devices have been known that read a document image by placing a bound document on a document table or the like with a two-page spread facing upward, illuminating a surface to be read of the document from above, and capturing an image of the document. In the image reading devices of this type, some techniques of reducing influence of halation that occurs with a glossy document have been known.

Japanese Laid-open Patent Publication No. 10-327301 discloses an image reading device that reads an image of a document from above by placing the document facing upward on a document table. The image reading device includes first lighting illuminating the document from a first direction, second lighting illuminating the document from a second direction, a charge-coupled device (CCD) sensor shooting an image of the document, and an arithmetic device that turns ON the first lighting and the second lighting sequentially, causes the CCD sensor to shoot images of the document, and calculates reflectance of a document surface from two pieces of obtained image data.

The conventional image reading devices, however, have problems that information acquisition and complicated calculation in order to correct brightness of reflection portions are necessary and much processing time and much memory are required.

Therefore, there is a need for an image reading device, an image processing apparatus, and an image reading method that are capable of reading an image while preventing halation without complicated calculation.

SUMMARY OF THE INVENTION

It is an object of the present invention to at least partially solve the problems in the conventional technology.

According an embodiment, an image reading device includes a shooting unit, a light source unit, a shooting controller, and a combining unit. The shooting unit shoots a shooting target from a position facing the shooting target and outputs a shot image as a two-dimensional image. At least when the shooting target is a bound document, the light source unit sequentially irradiates the bound document with light from a first irradiation position and from a second irradiation position opposing each other with respect to a first straight line substantially orthogonal to a direction of a binding portion of the document. The shooting controller controls the shooting unit to shoot a first region positioned at the second irradiation position side on the document when the light source unit irradiates the document with light from the first irradiation position and the light is regularly reflected by the document at the first irradiation position side, and controls the shooting unit to shoot a second region containing a region other than the first region on the document when the light source unit irradiates the document with light from the second irradiation position and the light is regularly reflected by the document at the second irradiation position side. The combining unit combines a two-dimensional image obtained by the shooting unit shooting the first region and a two-dimensional image obtained by the shooting unit shooting the second region to generate an image of the entire document.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a flowchart illustrating an operation example of the image reading device;

FIG. 8 is a side view illustrating halation occurrence places in a comparison example;

DETAILED DESCRIPTION OF THE PREFERRED EMBODIMENTS

Figure 1:
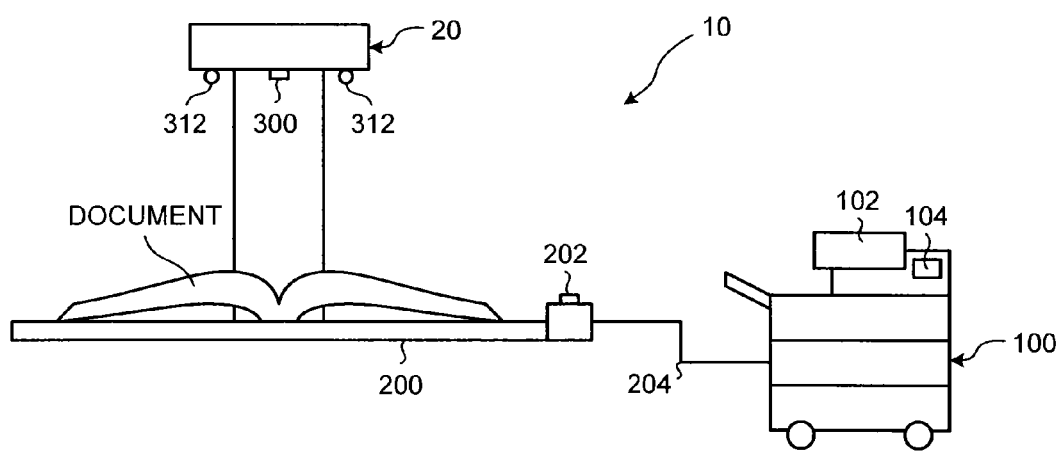
FIG. 1 is a view illustrating an outline of an image processing apparatus according to an embodiment.

Hereinafter, an image processing apparatus according to an embodiment will be described with reference to the accompanying drawings. FIG. 1 is a view illustrating an outline of an image processing apparatus 10 according to the embodiment. The image processing apparatus 10 includes an image reading device 20 and an image formation device 100, for example.

The image reading device 20 sequentially irradiates a document (for example, bound document) placed facing upward on a document table 200 with light from above by using a plurality of illumination lamps 312 and reads a two-dimensional image by using an area sensor (camera) 300 every time the document is irradiated with light. The image reading device 20 generates one document image by combining a plurality of read images. The document table 200 may include two guides and the like that slide in two directions orthogonal to each other so as to direct the document to a predetermined direction.

An operation unit 202 includes a start button causing the image reading device 20 to start reading the document. An operation of a switch of the start button by a user causes the image reading device 20 to start reading the document. The operation unit 202 may include switches or the like for sequentially switching lighting of the plurality of illumination lamps 312 and be configured to receive a plurality of operations by the user. To be specific, the operation unit 202 receives input of selection of sequential irradiation performed by the illumination lamps 312 in illumination blocks 310a and 310b or sequential irradiation performed by the illumination lamps 312 in illumination blocks 310c and 310d, for the light source unit 31. A signal cable 204 connects the image reading device 20 and the image formation device 100 and image data and the like are transferred therebetween through the signal cable 204.

When the document is read by shooting the two-dimensional image from above, reflection of room illumination onto the read image or reflection of the shadow of a photographer himself(herself) (external influence) occurs in some cases. In order to prevent the external influence, the image reading device 20 includes the plurality of illumination lamps 312. Influence of the illumination lamps 312 on the read image will be described later.

When the user sets the document on the document table 200, opens a page to be read, and presses the start button of the operation unit 202, the image reading device 20 sequentially turns ON the illumination lamps 312 and reads the document. Thereafter, when the user turns over pages and presses the start button repeatedly, the image reading device 20 successively reads images on the respective pages.

The image reading device 20 may be configured to transmit read image data to the image formation device 100 or output the image data to a storage device such as a universal serial bus (USB) memory in accordance with an operation on the operation unit 202 by the user.

The image formation device 100 is a processor that performs processing of forming an image based on the image data transmitted from the image reading device 20. The image formation device 100 is an image formation device of an electrophotography system, for example, and includes an operation unit 102, a USB socket 104, and other components.

The image formation device 100 includes an image formation unit of a tandem system, registration rollers supplying recording paper to the image formation unit through a conveyance path from a paper feeding unit, an optical writing device, a fixing unit, a conveying unit, and a double-sided tray in a main body of the image formation device, for example. In the image formation unit, four photoconductor drums corresponding to four colors of YMCK are arranged in parallel and image formation components including charging devices, developing devices, transfer devices, cleaners, and neutralizing devices are arranged around the respective photoconductor drums.

An intermediate transfer belt stretched between a driving roller and a driven roller is arranged between the transfer devices and the photoconductor drums in a state of being held by nips between them. The image formation device of the tandem system that is configured as described above performs optical writing onto the photoconductor drums corresponding to the colors of YMCK for the individual colors, performs development for individual color toners by the developing devices, and performs primary transfer onto the intermediate transfer belt in the order of Y, M, C, and K, for example. Then, a full-color image formed by superimposing toner images of four colors by the primary transfer is secondarily transferred onto the recording paper. Thereafter, the full-color image is fixed and the recording paper is ejected. In this manner, the full-color image is formed on the recording paper.

Figure 2:
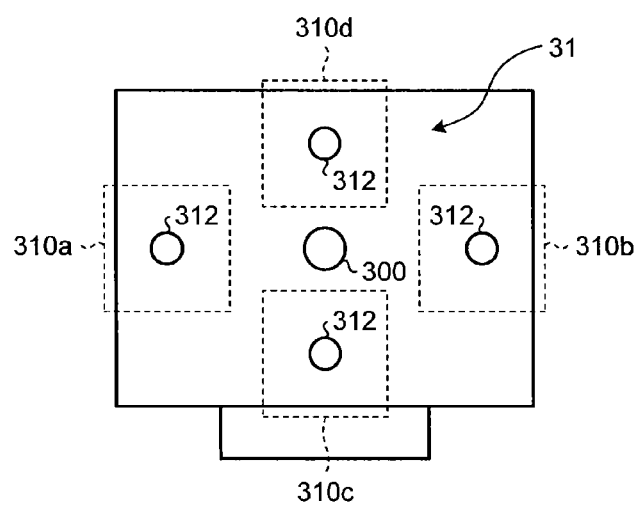
FIG. 2 is a view illustrating details of an area sensor and the periphery thereof in an image reading device.

FIG. 2 is a view illustrating details of the area sensor 300 and the periphery thereof in the image reading device 20. FIG. 2 is a view illustrating the area sensor 300 and other components illustrated in FIG. 1 viewed from below. The light source unit 31 is arranged around the area sensor 300.

The light source unit 31 is composed of the four illumination blocks 310a to 310d. Each of the illumination blocks 310a to 310d includes the illumination lamps 312. The illumination blocks 310a to 310d correspond to a first irradiation position to a fourth irradiation position, respectively. The illumination lamp (light source) 312 is composed of a light emitting diode (LED), a light guide lens, and the like. The illumination lamp 312 may be composed of a plurality of LEDs and the like. The illumination blocks 310a and 310b are arranged on one straight line. The illumination blocks 310c and 310d are arranged on a straight line orthogonal to the above-mentioned straight line. That is to say, at least when a shooting target is a bound document, the light source unit 31 sequentially irradiates the document with light from the first irradiation position and the second irradiation position opposing each other with respect to the first straight line substantially orthogonal to the direction of a binding portion of the document.

Figure 3:
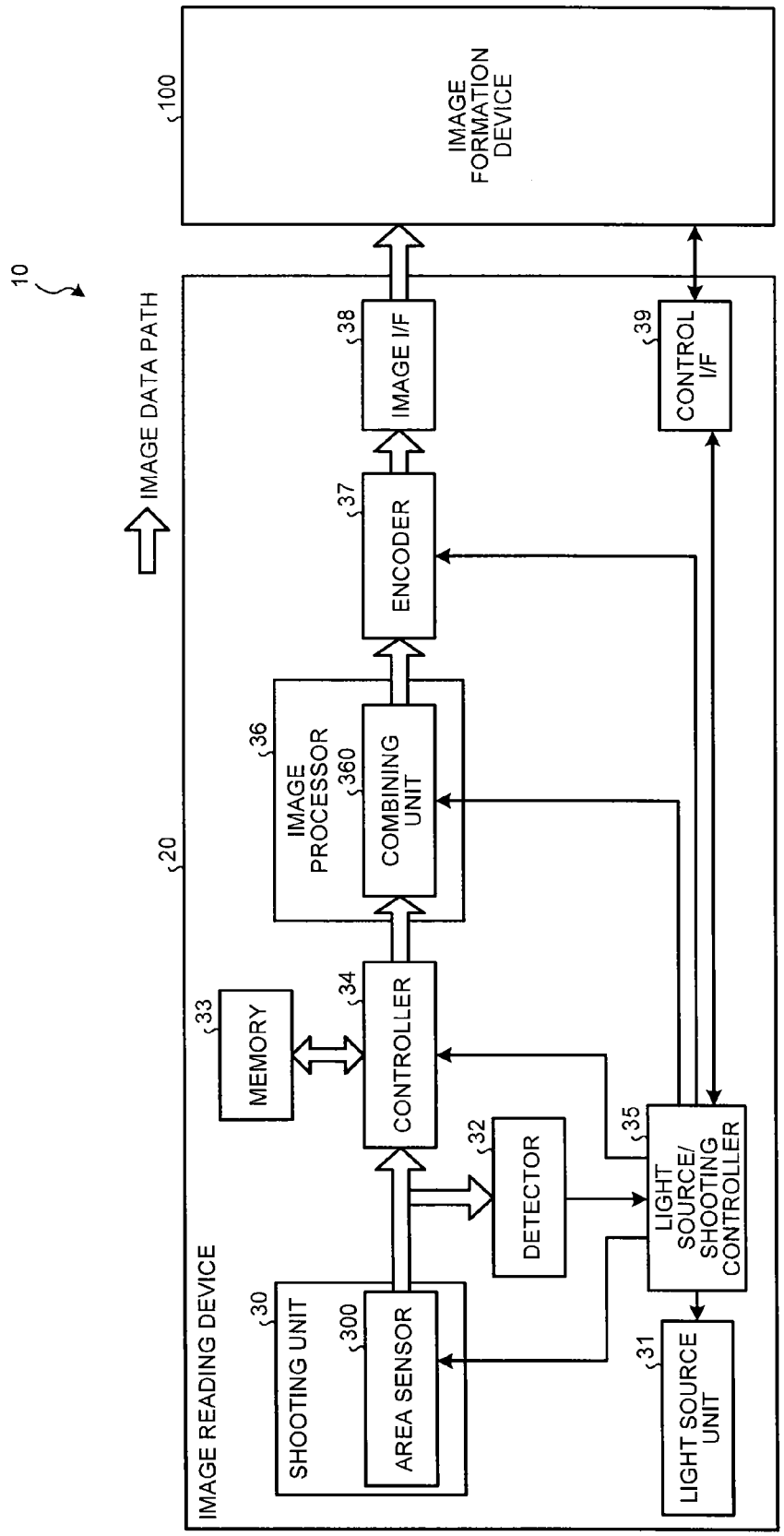
FIG. 3 is a block diagram illustrating an outline of functions of the image processing apparatus.

FIG. 3 is a block diagram illustrating an outline of functions of the image processing apparatus 10. The image reading device 20 includes a shooting unit 30, the above-mentioned light source unit 31, a detector 32, a memory 33, a controller 34, a light source/shooting controller 35, an image processor 36, an encoder 37, an image interface (I/F) 38, and a control interface (I/F) 39.

The shooting unit 30 includes the above-mentioned area sensor 300. The area sensor 300 is an image capturing element such as a CCD and a complementary metal oxide semiconductor (CMOS) sensor. In accordance with control by the light source/shooting controller 35, shooting conditions such as exposure time and signal gain are set to the shooting unit 30, and a shutter ON signal and an operation mode (video mode or still image mode) are set to the shooting unit 30.

Read image data formed by reading by the area sensor 300 is converted into a digital signal by an analog-to-digital (A/D) conversion circuit provided in the shooting unit 30, for example, and is subjected to γ conversion processing, demosaic processing, and the like. The resultant image data is output to the controller 34 and the detector 32 at subsequent stages, in a separated color (R, G, and B) unit. The area sensor 300 may be configured to output not data of RGB but data of YUV or YCbCr. In this manner, the shooting unit 30 shoots a shooting target from a position facing the shooting target and outputs a shot image as a two-dimensional image.

The area sensor 300 switches the image data that is output in accordance with the set operation mode. For example, when the image reading device 20 is in a standby state, the area sensor 300 operates in the video mode and continuously outputs a shot image to the outside for each frame rate set in advance. The shot images in the video mode that have been decimated from all effective pixels of the area sensor 300 are output and data amount per shot image is reduced.

The detector 32 detects a contour line of the document (boundary portion between the document and the document table 200) using the image data shot in the video mode by the shooting unit 30 and analyzes the detected contour line so as to detect a type of the document, a direction of the document, a direction of the binding portion of the document, and the like. The detector 32 detects deviation amounts of longitudinal sides and lateral sides of the document from straight lines. Then, the detector 32 determines whether the deviation amounts are larger than a predetermined threshold so as to determine whether the longitudinal sides and the lateral sides are straight or distorted. The detector 32 assigns the document shot by the shooting unit 30 to any one of document modes of four types illustrated in FIG. 4 as a detection result. The detector 32 outputs a signal (detection result) indicating the assigned document mode, which will be described later, to the light source/shooting controller 35.

When the image reading device 20 reads the image of the document, the area sensor 300 operates in the still image mode. That is to say, the area sensor 300 acquires the read image in a set shooting mode in synchronization with the shutter signal. In the still image mode, all pieces of effective pixel data of the area sensor 300 are output. The memory 33 at the subsequent stage uses the read image shot in the still image mode.

The controller 34 controls an accumulation start timing, a reading timing, a write address, a read address, and the like of the image data in the memory 33 in accordance with the operation of the light source/shooting controller 35. The controller 34 writes (or reads) the read image data of RGB that has been shot in the still image mode by the area sensor 300 into (from) the memory 33.

The memory 33 is provided in order to enable the image reading device 20 to acquire the read image a plurality of number of times for reading of one document while switching the lighting states of the plurality of illumination lamps 312.

The light source/shooting controller 35 controls timings at which the individual illumination lamps 312 of the light source unit 31 are turned ON and OFF, timing at which the shooting unit 30 shoots the document, settings for the image reading device 20, and the like. The light source/shooting controller 35 controls the shooting unit to shoot a first region (see FIGS. 7A to 7C) positioned at the second irradiation position side on the document when the light source unit 31 irradiates the document with light from the first irradiation position and the light is regularly reflected by the document at the first irradiation position side. The light source/shooting controller 35 controls the shooting unit to shoot a second region (see FIGS. 7A to 7C) containing a region other than the first region on the document when the light source unit 31 irradiates the document with light from the second irradiation position and the light is regularly reflected by the document at the second irradiation position side. The light source/shooting controller 35 may be divided into a shooting controller controlling the shooting unit 30 and a light source controller controlling the light source unit 31.

The image processor 36 includes a combining unit 360 that combines a plurality of images shot by a plurality of number of times. The image processor 36 also performs correction of differences in brightness among the plurality of images shot by the plurality of number of times, and other processing. To be specific, the image processor 36 executes the γ correction of different types on an image in the first region and an image in the second region, which will be described later. The encoder 37 encodes image data by a compression method such as (joint photographic experts group) JPEG. The image I/F 38 outputs image data in a predetermined data format to the image formation device 100.

The image reading device 20 receives, through the control I/F 39, directions of execution of image reading, operation settings, and the like that are input by the user from the operation unit 102 of the image formation device 100 connected to the image reading device 20 through the signal cable 204. The control I/F 39 outputs the received directions and the like to the light source/shooting controller 35. The light source/shooting controller 35 also controls the units constituting the image reading device 20.

Figure 4A:
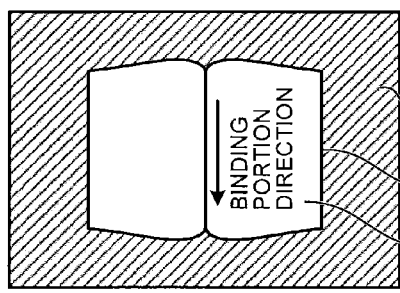
FIGS. 4A to 4D are views each illustrating a document mode that is output as a detection result by a detector.

FIGS. 4A to 4D are views each illustrating the document mode that is output as the detection result by the detector 32. FIG. 4A is a view illustrating a first document mode. The first document mode is a state where the longitudinal sides of the document are straight, the lateral sides thereof are distorted, and the bound document is placed in a right and left opened manner. In this case, the direction of the binding portion of the document corresponds to the up and down direction.

Figure 4B:
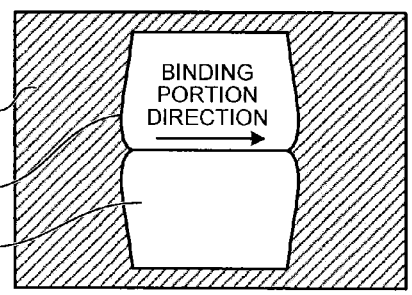

FIG. 4B is a view illustrating a second document mode. The second document mode is a state where the lateral sides of the document are straight, the longitudinal sides thereof are distorted, and the bound document is placed in an up and down opened manner. In this case, the direction of the binding portion of the document corresponds to the right and left direction.

Figure 4C:
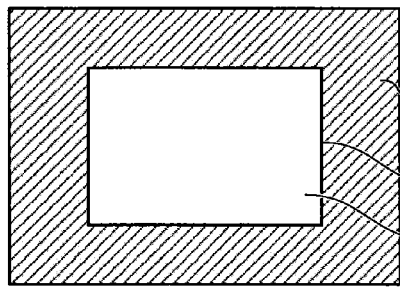

FIG. 4C is a view illustrating a third document mode. The third document mode is a state where both of the lateral sides and the longitudinal sides of the document are straight, and the document is a sheet document or a bound document with significantly less distortion.

Figure 4D:
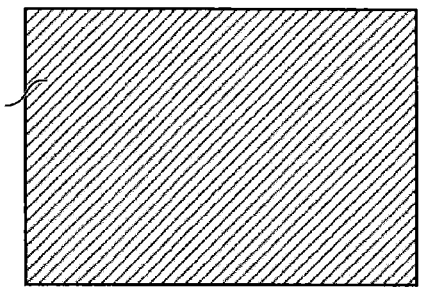

FIG. 4D is a view illustrating a fourth document mode. The fourth document mode is a state corresponding to none of the first document mode to the third document mode and indicates a state where the document is not placed or a state where a document having a special shape is placed.

The image reading device 20 is configured such that the detector 32 outputs a signal indicating any one of the above-mentioned four document modes to the light source/shooting controller 35 in a standby state. The document generally has a low density close to white in many cases. It is therefore desired that the document table 200 is composed of a member having a high density so as to enable the contour line of the document to be detected easily.

FIGS. 5A to 5D are views each illustrating lighting states of the illumination lamps 312, and an irradiation range on the document table 200 in the image reading device 20. FIGS. 5A to 5D each illustrate a state of the document table 200 viewed from above and positions of the illumination lamps 312 viewed from above. As described above, the light source unit 31 is composed of the four illumination blocks of the illumination blocks 310a to 310d (blocks A to D). The light guide lens and the like of the illumination lamp 312 included in each of the illumination blocks 310a to 310d appropriately define an irradiation range of output light from the LED.

Figure 5A:
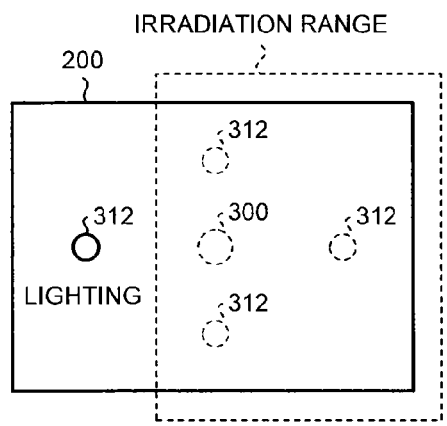
FIGS. 5A to 5D are views each illustrating lighting states of illumination lamps and an irradiation range on a document table in the image reading device.

FIG. 5A illustrates a state where the illumination lamp 312 in the illumination block 310a is turned ON and the illumination lamp 312 irradiates a region containing a right-half portion of the document table 200 (region containing a right-side portion relative to the center of the document, for example) with light.

Figure 5B:
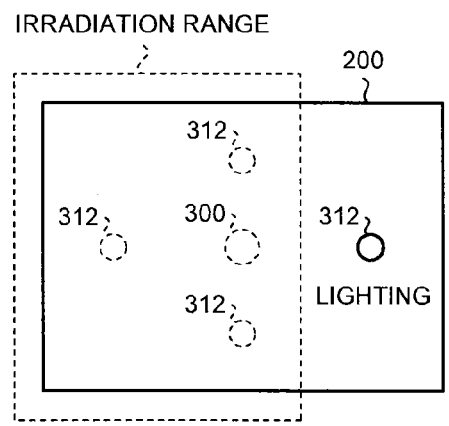

FIG. 5B illustrates a state where the illumination lamp 312 in the illumination block 310b is turned ON and the illumination lamp 312 irradiates a region containing a left-half portion of the document table 200 (region containing a left-side portion relative to the center of the document, for example) with light.

Figure 5C:
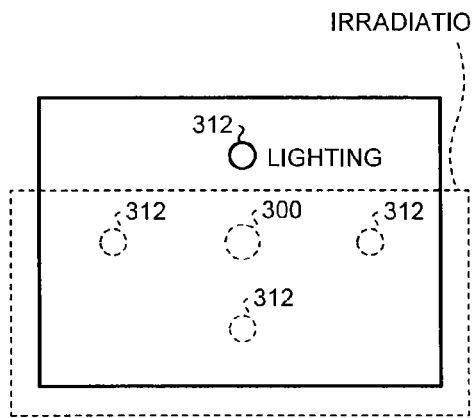

FIG. 5C illustrates a state where the illumination lamp 312 in the illumination block 310c is turned ON and the illumination lamp 312 irradiates a region containing a front-half (lower-half) portion of the document table 200 (region containing a front-side portion relative to the center of the document, for example) with light.

Figure 5D:
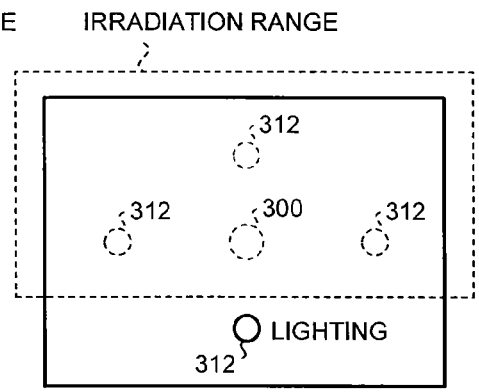

FIG. 5D illustrates a state where the illumination lamp 312 in the illumination block 310d is turned ON and the illumination lamp 312 irradiates a region containing a back-half (upper-half) portion of the document table 200 (region containing a back-side portion relative to the center of the document, for example) with light.

FIG. 6 is a flowchart illustrating an operation example of the image reading device 20. In the image reading device 20, when the user presses the start button of the operation unit 202, the detector 32 determines any one of the above-mentioned four document modes, and the light source/shooting controller 35 receives and holds a signal indicating the document mode that is output from the detector 32 (S100).

The light source/shooting controller 35 determines the illumination lamp 312 to be turned ON based on the signal indicating the received document mode (S102). When the document mode is the first document mode (1), the light source/shooting controller 35 turns ON the illumination lamp 312 (block D) in the illumination block 310d (S104). When the document mode is any of the second document mode to the fourth document mode (2 to 4), the light source/shooting controller 35 turns ON the illumination lamp 312 (block B) in the illumination block 310b (S106).

Subsequently, the light source/shooting controller 35 switches settings of various types for the area sensor 300 to those that are necessary for shooting a still image (S108) and turns ON the shutter of the area sensor 300 (S110). The settings of various types that are necessary for shooting the still image include switching to the still image mode from the video mode and settings of the exposure time and the signal gain for the still image mode.

When the area sensor 300 outputs a first read image (first shot image), the controller 34 accumulates data of the first shot image in the memory 33 (S112). The light source/shooting controller 35 turns OFF the illumination lamp 312 used for shooting the first shot image (S114).

The light source/shooting controller 35 determines the illumination lamp 312 to be turned ON next based on the document mode determined in the processing at S100 (S116). When the document mode is the first document mode (1), the light source/shooting controller 35 turns ON the illumination lamp 312 (block C) in the illumination block 310c (S118). When the document mode is any of the second document mode to the fourth document mode (2 to 4), the light source/shooting controller 35 turns ON the illumination lamp 312 (block A) in the illumination block 310a (S120).

Subsequently, the light source/shooting controller 35 switches the settings of various types for the area sensor 300 to those that are necessary for shooting the still image (S122) and turns ON the shutter of the area sensor 300 (S124).

When the area sensor 300 outputs a second read image (second shot image), the controller 34 accumulates data of the second shot image in the memory 33 (S126). The light source/shooting controller 35 turns OFF the illumination lamp 312 used for shooting the second shot image (S128).

When parameter setting for correcting image quality of the first shot image and the second shot image is required, the image processor 36 performs the parameter setting (S130). The controller 34 partially reads the first shot image and the second shot image accumulated in the memory 33 (see FIGS. 7A to 7C) (S132).

The image processor 36 combines the first shot image and the second shot image partially read from the memory 33 by the controller 34, performs JPEG encoding, and outputs one final document image to the image formation device 100 through the image I/F 38 (S134). When there is a difference in brightness between the first shot image and the second shot image constituting the final document image, the image processor 36 performs correction to make the brightness uniform.

Then, the light source/shooting controller 35 switches the settings of various types for the area sensor 300 to those that are necessary for shooting a video (S136). The settings of various types that are necessary for shooting the video include switching to the video mode from the still image mode and settings of the exposure time and the signal gain for the video mode.

Figure 7A:
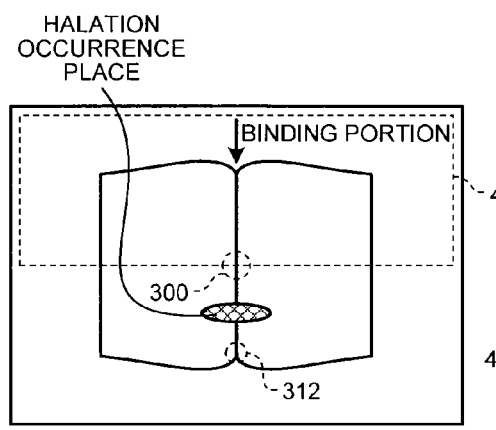
FIGS. 7A to 7B are views each illustrating partial read ranges of a first shot image and a second shot image accumulated in a memory.
Figure 7B:
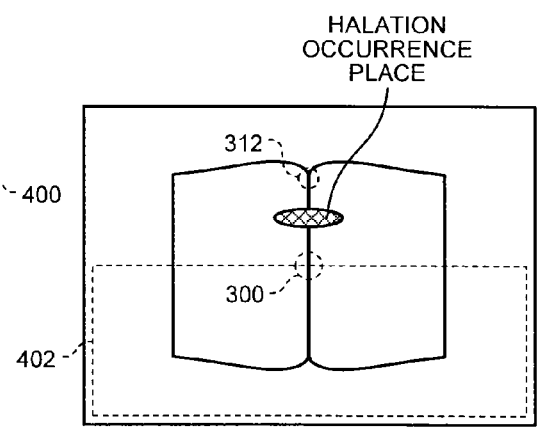

FIGS. 7A to 7B are views each illustrating partial read ranges of the first shot image and the second shot image accumulated in the memory 33. In FIG. 7A, the bound document containing the upper-half portion is irradiated with illumination light, and halation due to a regular reflection component of the light emitted from the illumination lamp 312 occurs at a lower position on the document that opposes a position between the lighting illumination lamp 312 and the area sensor 300. A range of the first shot image partially read from the memory 33 by the controller 34 corresponds to a read range 400.

In FIG. 7B, the bound document containing the lower-half portion is irradiated with illumination light, and the halation due to a regular reflection component of the light emitted from the illumination lamp 312 occurs at an upper position on the document that opposes a position between the lighting illumination lamp 312 and the area sensor 300. A range of the second shot image partially read from the memory 33 by the controller 34 corresponds to a read range 402.

Figure 7C:
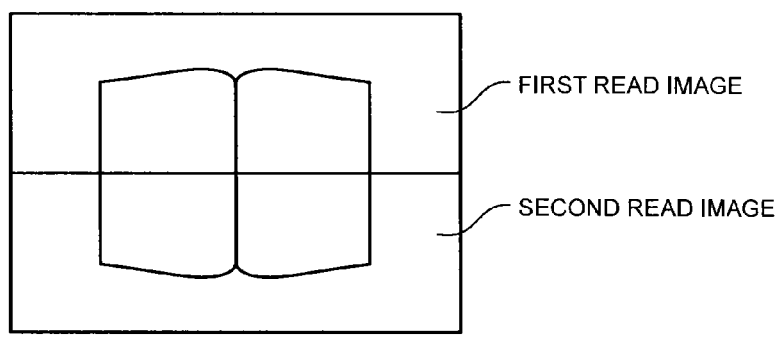
FIG. 7C is a view illustrating a final document image.

In the halation occurrence portion, the read image data is saturated or almost saturated. The combining unit 360 does not use an image of the halation occurrence portion as the final document image as illustrated in FIG. 7C. That is, the combining unit 360 combines the read range 400 serving as the first region of the first shot image and the read range 402 serving as the second region of the second shot image, for example, so as to generate the final document image. The image processor 36 may remove a margin region other than the document using the contour line of the document.

When the operation unit 202 has received the input of the selection of the sequential irradiation performed by the illumination lamps 312 in the illumination blocks 310c and 310d, the light source/shooting controller 35 may perform control to assume the illumination block 310c as the illumination block 310a and the illumination block 310d as the illumination block 310b.

Figure 9A:
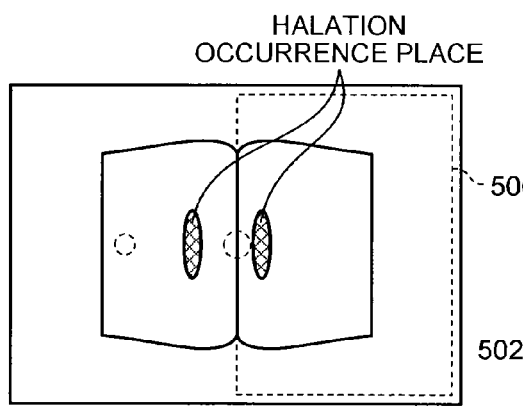
FIGS. 9A to 9C are views each illustrating a document indicating the halation occurrence places in the comparison example viewed from above.
Figure 9B:
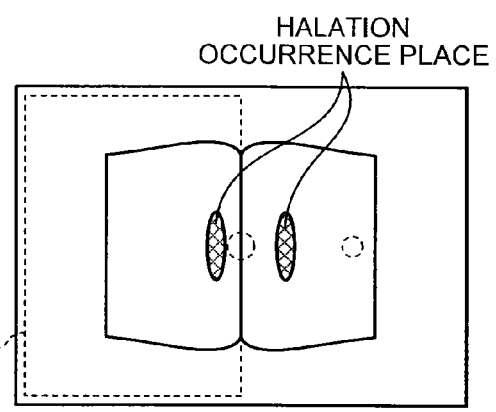
Figure 9C:
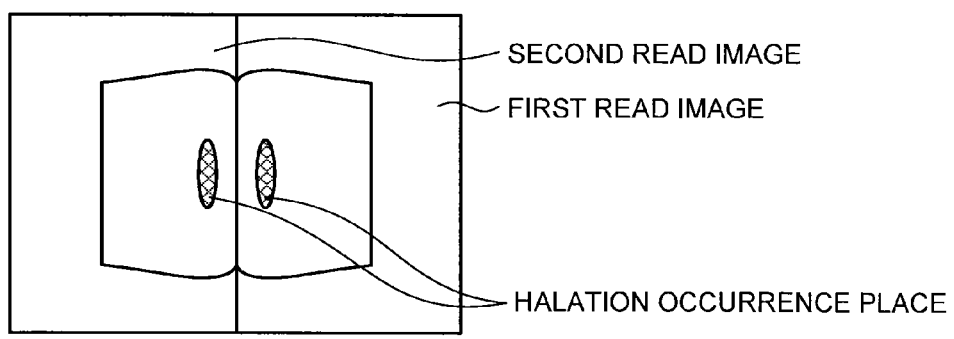

Next, a comparison example will be described. FIG. 8 is a side view illustrating halation occurrence places in the comparison example. FIGS. 9A to 9C are views each illustrating a document indicating the halation occurrence places in the comparison example viewed from above. For example, when the illumination lamp 312 in the illumination block 310a is turned ON although the document is set in the right and left opened manner, the document containing the right-side region is irradiated with the irradiation light, as illustrated in FIG. 8 and FIG. 9A.

The halation occurs not only at the position opposing the position between the illumination lamp 312 and the area sensor 300 but also at a plurality of places depending on distortion states of the bound document. For example, the halation occurs in a read range 500 of the first shot image and a read range 502 of the second shot image. It is difficult to expect the halation occurrence place because it depends on distortion manners of the document. It is therefore difficult to acquire the preferable final read image with no halation even when combining the images (FIG. 9C).

As illustrated in FIG. 9B, also when the illumination lamp 312 in the illumination block 310b is turned ON, the halation occurs not only at the position opposing the position between the illumination lamp 312 and the area sensor 300 but also at a plurality of places depending on the distortion states of the bound document in the same manner.

Figure 10:
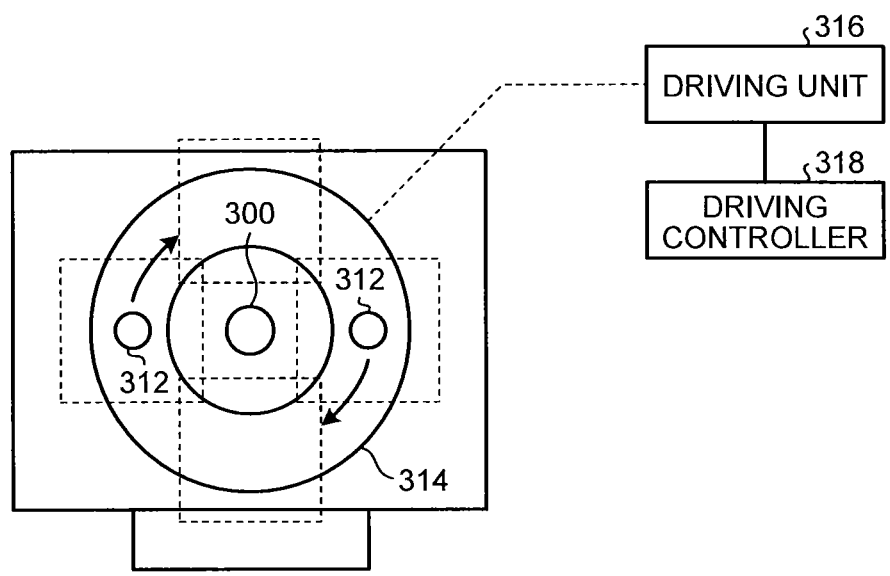
FIG. 10 is a view illustrating an area sensor and the periphery thereof in a modification of a light source unit.

Next, a modification of the light source unit 31 will be described. FIG. 10 is a view illustrating the area sensor 300 and the periphery thereof in the modification of the light source unit 31. FIG. 10 is a view when the area sensor 300 and other components illustrated in FIG. 1 are seen from below. The two illumination lamps 312 are provided on a rotating unit 314 rotating about the area sensor 300.

The rotating unit 314 is driven by a driving unit 316 so as to move the illumination lamps 312. A driving controller 318 controls the driving unit 316 such that the illumination lamps 312 are moved to positions in the illumination blocks 310a and 310b or the illumination blocks 310c and 310d. That is to say, in the modification of the light source unit 31, the illumination lamps 312 the number of which is less than that in the light source unit 31 illustrated in FIG. 2 can irradiate the document with light from the positions in the illumination blocks 310a to 310d.

Figure 11:
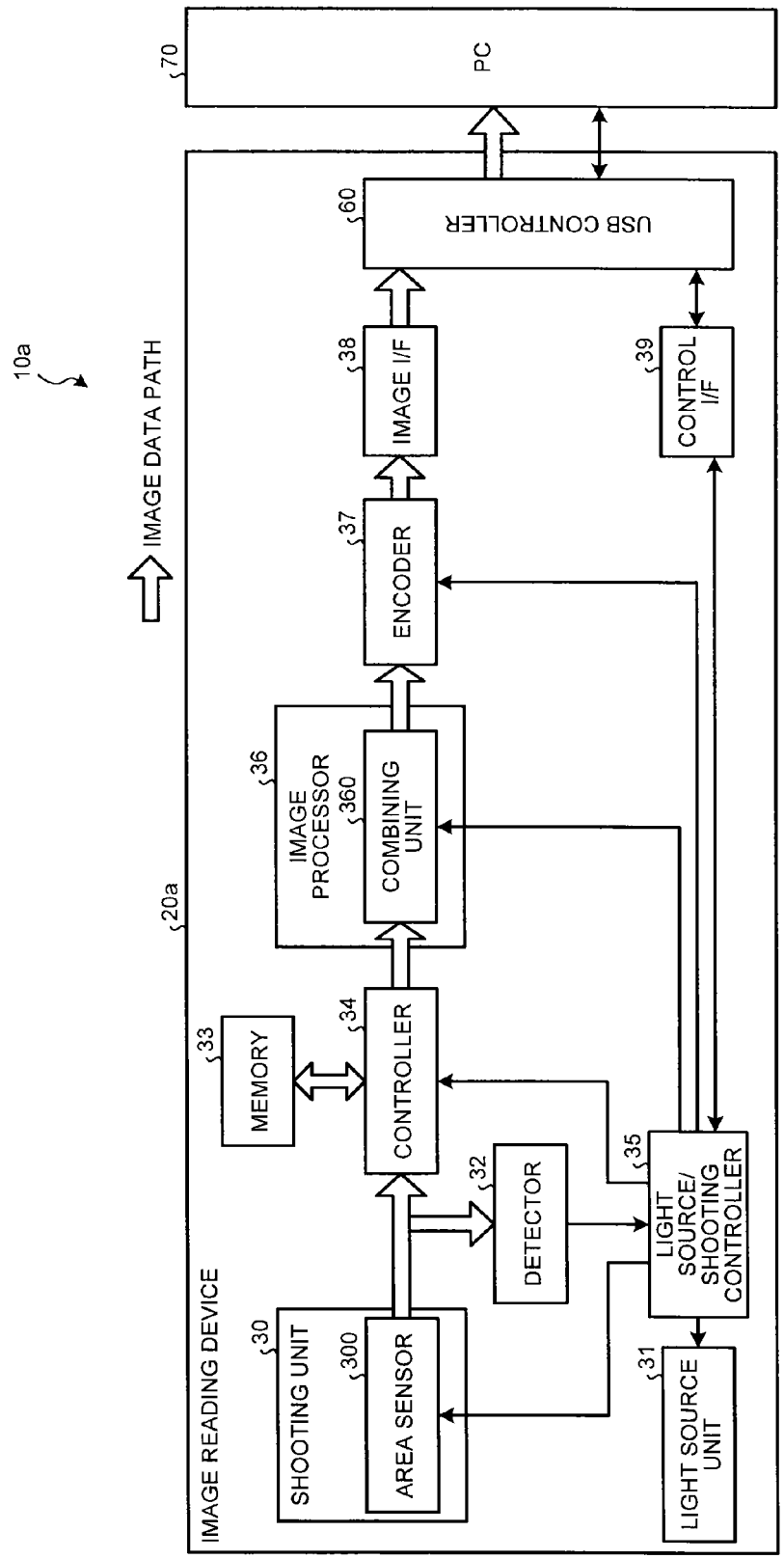
FIG. 11 is a diagram illustrating an outline of a modification of the image processing apparatus.

FIG. 11 is a diagram illustrating an outline of a modification of the image processing apparatus 10 (image processing apparatus 10a). For example, the image processing apparatus 10a includes an image reading device 20a and a personal computer (PC) 70. Among constituent components of the image processing apparatus 10a illustrated in FIG. 11, the same reference numerals denote constituent components that are substantially the same as those of the image processing apparatus 10 (FIG. 3).

The image reading device 20a includes a USB controller 60 in addition to the configuration of the image reading device 20. The USB controller 60 makes communication of image data and the like with the PC (processor) 70 that has functions as a computer and performs image processing and the like. That is to say, the image reading device 20a includes hardware and software compatible with a device class of a commonly used image scanner that is connected through a USB so as to be operated by an application on the PC 70.

The present invention provides an effect that an image can be read while preventing halation without complicated calculation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An image reading device comprising:
a camera that shoots a shooting target from a position facing the shooting target and outputs a shot image as a two-dimensional image;
a light source unit that, at least when the shooting target is a bound document, sequentially irradiates the bound document with light from a first irradiation position and from a second irradiation position opposing each other with respect to a first straight line, which is in a plane of the document, and which is orthogonal to a direction of a binding portion of the document, the first straight line dividing the shooting target into an upper portion which includes the first irradiation position, and a lower portion which includes the second radiation position;
a shooting controller that
controls the camera to shoot a first region positioned at the second irradiation position side on the document when the light source unit irradiates the document with light from the first irradiation position and the light is regularly reflected by the document at the first irradiation position side, and
controls the camera to shoot a second region containing a region other than the first region on the document when the light source unit irradiates the document with light from the second irradiation position and the light is regularly reflected by the document at the second irradiation position side; and
a processor that combines a two-dimensional image obtained by the camera shooting the first region and a two-dimensional image obtained by the camera shooting the second region to generate an image of the entire document.
2. The image reading device according to claim 1, wherein the light source unit includes:
a first light source that is provided at the first irradiation position and irradiates the document with light; and
a second light source that is provided at the second irradiation position and irradiates the document with light.
3. The image reading device according to claim 2, wherein
the light source unit further includes a third light source and a fourth light source that sequentially irradiate the document with light from a third irradiation position and a fourth irradiation position, respectively, opposing each other with respect to a second straight line, which is in the plane of the document, and which is orthogonal to the first straight line;
the image reading device further comprises:
a user interface that receives input of selection of sequential irradiation performed by the first light source and the second light source or sequential irradiation performed by the third light source and the fourth light source, for the light source unit; and
a light source controller that performs control to switch to the sequential irradiation performed by the first light source and the second light source or the sequential irradiation performed by the third light source and the fourth light source, based on the input received by the user interface, and
the shooting controller assumes the third irradiation position as the first irradiation position and the fourth irradiation position as the second irradiation position when the user interface has received the input of the selection of the sequential irradiation performed by the third light source and the fourth light source.

4. The image reading device according to claim 2, wherein
- the light source unit further includes a third light source and a fourth light source that sequentially irradiate the document with light from a third irradiation position and a fourth irradiation position, respectively, opposing each other with respect to a second straight line orthogonal to the first straight line;
- the image reading device further comprises:
  - a detector that detects whether the direction of the binding portion of the document is a direction orthogonal to the first straight line or a direction orthogonal to the second straight line; and
  - a light source controller that performs control to switch to sequential irradiation performed by the first light source and the second light source or sequential irradiation performed by the third light source and the fourth light source based on a detection result by the detector, and
- the shooting controller assumes the third irradiation position as the first irradiation position and the fourth irradiation position as the second irradiation position when the detector has detected that the direction of the binding portion of the document is the direction orthogonal to the second straight line.

5. The image reading device according to claim 1, wherein
- the light source unit includes at least one light source that irradiates the document with light while a position of the light source varies when driven,
- the image reading device further comprises a driving controller that controls driving for the light source unit so as to cause the light source unit to sequentially irradiate the document with light from the first irradiation position and the second irradiation position.

6. The image reading device according to claim 5, further comprising a detector that detects the direction of the binding portion of the document, wherein
- the driving controller controls driving for the light source unit based on the direction of the binding portion of the document detected by the detector.

7. An image processing apparatus comprising:
the image reading device according to claim 1; and
a processor that processes an image generated by the image reading device.

8. An image reading method comprising:
sequentially irradiating a bound document with light from a first irradiation position and a second irradiation position opposing each other with respect to a first straight line, which is in a plane of the document, and which is orthogonal to a direction of a binding portion of the document;
shooting a two-dimensional first region positioned at the second irradiation position side on the document when the document is irradiated with light from the first irradiation position and the light is regularly reflected by the document at the first irradiation position side;
shooting a two-dimensional second region containing a region other than the first region on the document when the document is irradiated with light from the second irradiation position and the light is regularly reflected by the document at the second irradiation position side, the first straight line dividing the shooting target into an upper portion which includes the first irradiation position, and a lower portion which includes the second radiation position; and
combining the two-dimensional image obtained by shooting of the first region and the two-dimensional image obtained by shooting of the second region to generate an image of the entire document.

* * * * *